(12) United States Patent
Hamabe et al.

(10) Patent No.: US 6,355,100 B1
(45) Date of Patent: Mar. 12, 2002

(54) CORROSION INHIBITOR FOR CEMENT COMPOSITIONS

(75) Inventors: Kenkichi Hamabe; Takao Furusawa; Takeo Ozawa; Yuki Hagiwara, all of Kanagawa-ken (JP)

(73) Assignee: MBT Holding AG (CH)

( * ) Notice: Subject to any disclaimer, the term of this patent is extended or adjusted under 35 U.S.C. 154(b) by 0 days.

(21) Appl. No.: 09/701,472

(22) PCT Filed: Jun. 22, 1999

(86) PCT No.: PCT/EP99/04293

§ 371 Date: Jan. 2, 2001

§ 102(e) Date: Jan. 2, 2001

(87) PCT Pub. No.: WO99/67184

PCT Pub. Date: Dec. 29, 1999

(30) Foreign Application Priority Data

Jun. 23, 1998 (JP) .......................................... 10-191012

(51) Int. Cl.$^7$ .............................................. C04B 24/12
(52) U.S. Cl. ....................................... 106/808; 106/727
(58) Field of Search ............................... 106/14.15, 808, 106/727; 252/389.21, 389.41, 390, 394

(56) References Cited

U.S. PATENT DOCUMENTS 4,789,523 A    12/1988  Schilling et al. ............... 422/12
5,709,739 A  *  1/1998  Wittich et al. ............ 106/38.22

FOREIGN PATENT DOCUMENTS

EP          0 474 117 A1    11/1992    ............ C11D/1/40

OTHER PUBLICATIONS

Patent Abstracts of Japan, vol. 13, No. 427, C–639 abstract of JP 1–164746 A, Jun. 28, 1989.
Copy of PCT International Search Report for PCT/EP99/04293 dated Oct. 28, 1999.

* cited by examiner

*Primary Examiner*—Anthony Green
(74) *Attorney, Agent, or Firm*—Fish & Richardson P.C.

(57) ABSTRACT

An anti-corrosion agent for use with a cementitious composition which is to be reinforced, comprising one or more species selected from a group consisting of alkyldiamines represented by the general formula RHN—$(CH_2)$n-$NH_2$ (in which R is an alkyl having $C_{8-22}$ atoms, and n is an integer of 1–5) and alkylamines represented by the general formula R—$NH_2$ (in which R is an alkyl having $C_{8-22}$ atoms). The agents give good anti-corrosion performance which does not decline with time and exposure to the elements to the same extent as is the case with conventional anti-corrosion agents.

7 Claims, 1 Drawing Sheet

CORROSION INHIBITOR FOR CEMENT COMPOSITIONS

The invention relates to an anti-corrosion agent for use with reinforced cementitious compositions.

More precisely, the invention relates to a method of suppressing the corrosion of steel materials such as reinforcing bars, steel frames and PC steel wires in a concrete structure.

Currently, corrosion inhibition of reinforcing bars or steel frames is achieved by the addition to mortar or concrete of anti-corrosion agents such as nitrites (see JP, B, H2-28532) or alkanolamines (see JP, A, H7-173650), calcium nitrite being particularly effective. Because cementitious compositions such as mortar or concrete contain water, water-soluble anti-corrosion agents are often used.

The problem with water-soluble materials is that, on exposure of a cement product, a concrete product or a reinforced concrete structure containing such agents to wind and rain, water gradually permeates the material and the added anti-corrosion agents are gradually leached out. As a result, the initial corrosion resistance performance decreases over time. Moreover, as nitrites can accelerate concrete setting, it is necessary to adjust for this by also using a retarding agent, especially in hot weather.

Thus, the object of the invention is to provide an anti-corrosion agent for use with a reinforced cementitious composition which solves the abovementioned problems without having an adverse effect on the cement setting or strength, and whose anti-corrosion performance does not diminish prematurely with time.

It has now been found that, although alkyldiamines and alkylamines are slightly soluble in water, they quite unexpectedly demonstrate excellent anti-corrosion properties in a cementitious composition.

Accordingly, the invention provides a method of preventing corrosion of steel reinforcing elements in cementitious structures, comprising the addition to a cementitious mix which will form the structure of an anti-corrosion agent which consists of at least one species selected from a group consisting of alkyldiamines represented by the general formula RHN—(CH)n-NH$_2$ (in which R is an allyl having C$_{8-22}$ atoms, and n is an integer of 1–5) and alkylamines represented by the general formula R—NH$_2$ (in which R is an alkyl having C$_{8-22}$ atoms).

The method not only gives excellent anti-corrosion performance, but also results in low toxicity and does not have an adverse effect on cement setting or strength; therefore, it is easy to handle. Furthermore, as alkyldiamines and alkylamines are basically hydrophobic, they do not leach out even on the exposure to rainfall and do not lose their anti-corrosion effect over time to the same extent as do known anti-corrosion agents.

By "alkyldiamines" and "alkylamines" is meant not only the compounds themselves but also their salts with inorganic or organic acids. The inorganic acid may be, for example, nitrous acid, nitric acid, sulfuric acid, boric acid, phosphoric acid, pyrophosphoric acid or phosphonic acid. The organic acid may be, for example, formic acid, acetic acid, benzoic acid, citric acid, adipic acid, lactic acid, gluconic acid, heptonic acid, ascorbic acid, sulfanilic acid or salicylic acid. It is possible to use both an alkyldiamine/alkylamine and a salt of one or both compounds in the same anti-corrosion agents.

The anti-corrosion agents used in the present invention may also contain known anti-corrosion agents such as nitrites, chromates, phosphate, benzotriazoles or alkanolamines. Suitable alkanolamines include N,N-diethyl-ethanolamine, N-methyl-ethanolamine, monoethanloamine, diethanloamine, triethanloamine and the like.

Cementitious compositions in which the method of the present invention may be used include cement milk, grout, mortar, concrete or the like which contain at least cement. They are not necessarily mixed with water and can be a dry-mix for the preparation of cement milk, grout, mortar or concrete. Suitable cements include normal cement, high-early-strength cement, moderate heat cement, ultra-rapid-hardening cement, blast furnace slag cement, fly ash cement and the like.

The method of the present invention may be performed by adding the anti-corrosion agent to a cementitious mix such as cement milk, grout, mortar or concrete in a range of 0.05–5.0 wt. % on the basis of the cement weight in the cementitious composition.

Additionally, the anti-corrosion agents for the cementitious compositions of the method of the present invention may be used together with other known additives for mortar or concrete, including water-reducing agents, air-entraining agents, setting accelerators, retarders, expansive agents, plastic emulsions, and so on.

The invention further provides a reinforced cementitious structure comprising a hard cementitious composition which has within it steel reinforcing members, the reinforcing members being protected from corrosion by the incorporation in the cementitious composition prior to hardening of an anti-corrosion agent which consists of at least one species selected from a group consisting of alkyldiamines represented by the general formula RHN—(CH$_2$)n-NH$_2$ (in which R is an alkyl having C$_{8-22}$ atoms, and n is an integer of 1–5) and alkylamines represented by the general formula R—NH$_2$ (in which R is an alkyl having C$_{8-22}$ atoms).

The invention is further described with reference to the following non-limiting examples.

1. Mortar Test

1) Mix proportion ad preparation of mortar

Mortar for testing is obtained by mixing sand/cement ratio of 2.0, water/cement ratio of 0.40 and superplasticiser, mainly consisting of formalin condensates of napthalenesulfonate, at a rate of 0.5 wt. % on cement. In all mortars except the comparative example 1, there is added sodium chloride at a rate of 1.5 wt. % on cement in order to accelerate the rusting of reinforcing bars.

2. Test Method

1) Setting time: According to JIS A 6204 Annex 1.
2) Compressive strength: According to JIS R 5201.
3) Corrosion suppression test

TABLE 1

| | |
|---|---|
| Known anti-rust agents | Calcium nitrite ("CN") |
| | Triethanoiamine ("TFA") |
| Alkyldiamine | N-Harding beef tallow alkyl-1,3-diaminopropane (manufactured by Lion Akzo Co., Ltd., trade name: DUOMEEN HT FLAKE) ("ADA1") |
| | N-Coconut alkyl-1,3-diaminopropane (manufactured by Lion Akzo Co., Ltd., trade name: DUOMFEN CD) ("ADA2") |
| Alkylamine | Octadecylamine (trade name: ARMEEN 18 FLAKE) ("AA1") |
| | Harding beef tallow alkylamine (manufactured by Lion Akzo Co., Ltd., trade name: ARMEEN HT FLAKE) ("AA2") |
| Akylamine salt | Acetic acid salt of octadecylamine (trade name: ARMAC 18D) ("ADAS") |

4. Test Results

The test results are shown in Table 2. Comparative example 1 in Table 2 is the case in which there is no sodium chloride and no anti-corrosion agent, comparative example 2 is a case in which sodium chloride is added and the anti-corrosion agent is not added, comparative example 3 is a case in which sodium chloride and calcium nitrite are added, and examples 1–12 are cases in which sodium chloride and the anti-corrosion agents of the present invention are added, and the results of these cases are shown.

1) Setting Time

The setting time of comparative example 2 is faster than that of comparative example 1. The setting time of comparative example 3 is faster again than that of comparative example 2. The setting times of the examples 1–12 are almost the same as that of comparative example 2, showing that the anti-corrosion agents of the present invention have no effect on the setting.

2) Compressive Strength

The compressive strength at age 3 days in comparative examples 2 and 3 and the examples 1–12 is higher than that in comparative example 1 owing to the early-strength action of sodium chloride. The compressive strength at ages 3 days and 28 days in the examples 1–12 is of the same degree as that of comparative example 2, showing that the anti-corrosion agents for the cementitious compositions of the present invention have no effect on the compressive strength.

TABLE 2

| | Sodium chloride added amount (%) | Anti-corrosion agents Type | Added Amount (%) | Setting time Start | (h-m) Finish | Compressive strength 3 days | (N/mm$^2$) 28 days |
|---|---|---|---|---|---|---|---|
| Comparative Example 1 | not | not | — | 5–55 | 7–25 | 30.2 | 58.6 |
| Comparative Example 2 | 1.5 | not | — | 5–10 | 6–20 | 43.8 | 57.4 |
| Comparative Example 3 | | CN | 0.50 | 4–50 | 6–00 | 44.5 | 55.8 |
| Example 1 | | ADA 1 | 0.25 | 5–05 | 6–25 | 43.6 | 58.2 |
| Example 2 | | | 0.50 | 5–05 | 6–30 | 43.4 | 58.6 |
| Example 3 | | ADA2 | 0.25 | 5–10 | 6–15 | 43.2 | 57.6 |
| Example 4 | | | 0.50 | 5–10 | 6–20 | 43.4 | 57.8 |
| Example 5 | | AA1 | 0.25 | 5–15 | 6–20 | 44.1 | 57.4 |
| Example 6 | | | 0.50 | 5–10 | 6–15 | 44.2 | 57.5 |
| Example 7 | | AA2 | 0.25 | 5–05 | 6–20 | 43.8 | 58.1 |
| Example 83 | | | 0.50 | 5–10 | 6–15 | 43.6 | 58.0 |
| Example 9 | | ADAS | 0.25 | 5–30 | 6–35 | 44.5 | 56.6 |
| Example 10 | | | 0.50 | 5–40 | 6–40 | 44.2 | 57.6 |
| Example 11 | | ADA 1 CN | 0.25 0.25 | 5–30 | 6–35 | 44.2 | 57.3 |
| Example 12 | | ADA1 TEA | 0.25 0.10 | 5–10 | 6–30 | 44.4 | 58.1 |

Note) The added amounts of sodium chloride and the anti-corrosion agents are % by weight on cement.

3) Corrosion Suppression

The test results are shown in FIG. 1. In comparison to the case in which sodium chloride is added and the anti-corrosion agent is not added (comparative example 2), the case in which sodium chloride and calcium nitrite are added (comparative example 3), shows the larger electrode potential value, and the corrosion is suppressed. Examples 2, 4, 6, 8, 10, 12 show larger electrode potential value than that of comparative example 2, demonstrating corrosion suppression.

It can be seen that the anti-corrosion agents of the invention do not have the adverse effect on the manifestation of the cement setting or strength and demonstrate the excellent anti-corrosion effect on reinforcement bars even in an environment which contains a large quantity of sodium chloride.

Figure 1:
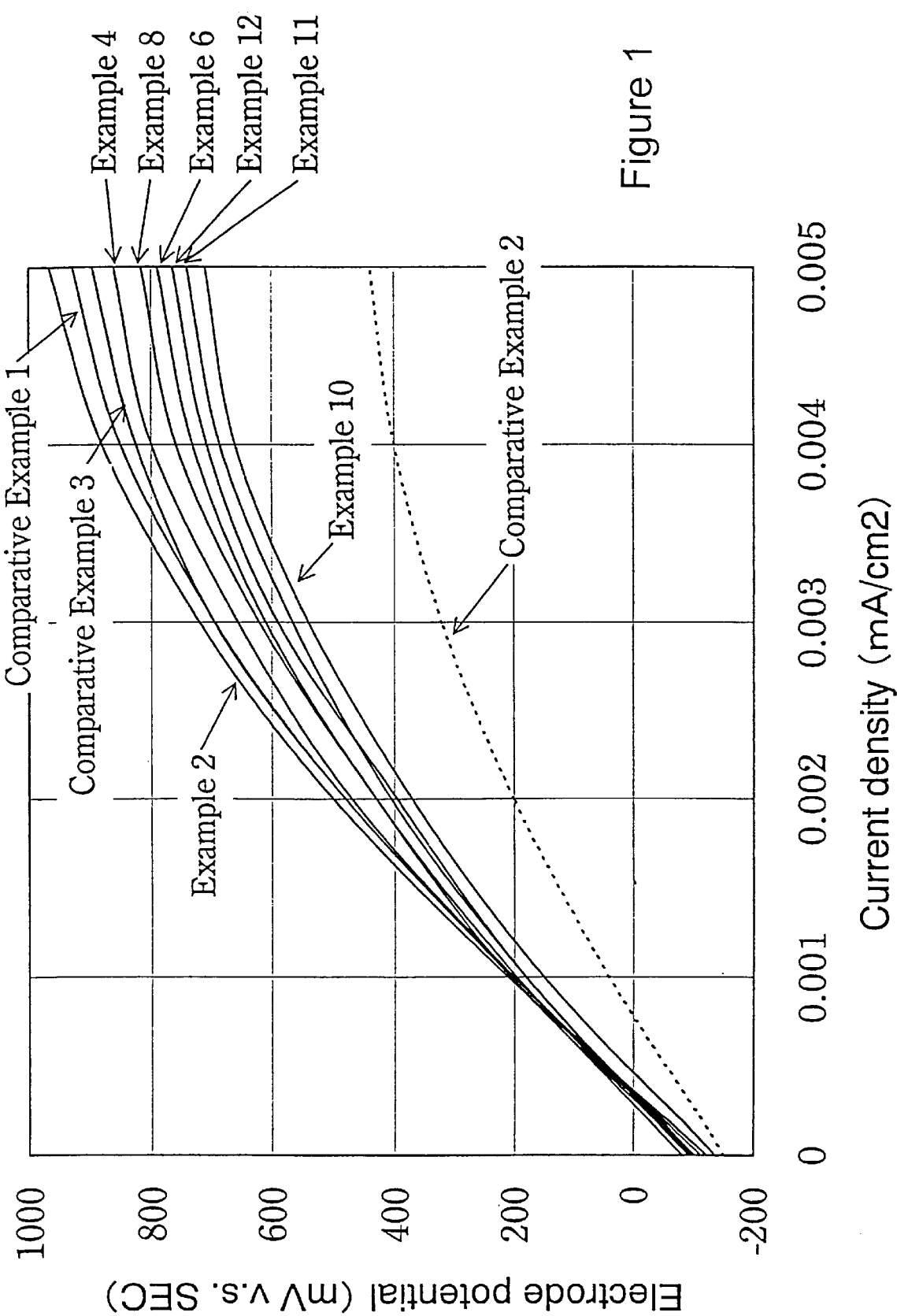
[FIG. 1] The graph showing the degree of corrosion by the electrode potential value against the current density.

What is claimed is:

1. A method of preventing corrosion of steel reinforcing elements in cementitious structures, comprising the addition to a cementitious mix of an anti-corrosion agent which consists of at least one species selected from the group consisting of alkyldiamines represented by the general formula $RHN-(CH_2)_n-NH_2$ (in which R is an alkyl having $C_{8-22}$ carbon atoms, and n is an integer of 1–5) and alkyldiamines represented by the general formula $R-NH_2$ (in which R is an alkyl having $C_{8-22}$ atoms).

2. A method according to claim 1, wherein the alkyldiamines or alkylamines are in the form of inorganic acid salts or organic acid salts.

3. A method according to claim 2, wherein the organic or inorganic acids are selected from the group consisting of nitrous acid, nitric acid, sulfuric acid, boric acid, phosphoric acid, pyrophosphoric acid, phosphonic acid, formic acid, acetic acid, benzoic acid, citric acid, adipic acid, lactic acid, gluconic acid, heptonic acid, ascorbic acid, sulfanilic acid, and salicylic acid.

4. A method according to claim 1, wherein the anti-corrosion agent is present in the cementitious mix in the proportion of 0.05–5.0% by weight of cement in the cementitious mix.

5. A method according to claim 2 wherein the anti-corrosion agent is present in the cementitious mix in the proportion of 0.05–5.0% by weight of cement in the cementitious mix.

6. A method according to claim 3 wherein the anti-corrosion agent is present in the cementitious mix in the proportion of 0.05–5.0% by weight of cement in the cementitious mix.

7. A reinforced cementitious structure comprising a hard cementitious composition which includes steel reinforcing members, the reinforcing members being protected from corrosion by the incorporation in the cementitious composition prior to hardening of an anti-corrosion agent which consists of at least one species selected from the group consisting of alkyldiamines represented by the general formula $RHN-(CH_2)_n-NH_2$ (in which R is an alkyl having $C_{8-22}$ atoms, and n is an integer of 1–5) and alkylamines represented by the general formula $R-NH_2$ (in which R is an alkyl having $C_{8-22}$ atoms).

* * * * *